(12) United States Patent
Pinkas et al.

(10) Patent No.: US 7,758,814 B2
(45) Date of Patent: Jul. 20, 2010

(54) MICROFLUIDIC FLUID DISTRIBUTION MANIFOLD FOR USE WITH MULTI-CHANNEL REACTOR SYSTEMS

(75) Inventors: Daniel M. Pinkas, Menlo Park, CA (US); H. Sam Bergh, San Francisco, CA (US); Shenheng Guan, Palo Alto, CA (US); Nallakkan Arvindan, San Jose, CA (US)

(73) Assignee: Freeslate, Inc., Sunnyvale, CA (US)

( * ) Notice: Subject to any disclaimer, the term of this patent is extended or adjusted under 35 U.S.C. 154(b) by 1357 days.

(21) Appl. No.: 11/145,050

(22) Filed: Jun. 3, 2005

(65) Prior Publication Data
US 2006/0006065 A1   Jan. 12, 2006

Related U.S. Application Data

(60) Provisional application No. 60/577,310, filed on Jun. 5, 2004.

(51) Int. Cl.
*B01L 3/02* (2006.01)
*B01L 99/00* (2006.01)

(52) U.S. Cl. .................. 422/101; 422/100; 422/68.1; 422/70

(58) Field of Classification Search ........... 422/99–101, 422/68.1, 70
See application file for complete search history.

(56) References Cited

U.S. PATENT DOCUMENTS

| | | | |
|---|---|---|---|
| 3,680,576 A | 8/1972 | Kiwak | |
| 3,731,700 A | 5/1973 | Cohen | |
| 5,976,336 A | 11/1999 | Dubrow et al. | |
| 6,074,725 A | 6/2000 | Kennedy | |
| 6,149,882 A | 11/2000 | Guan et al. | |
| 6,193,471 B1 | 2/2001 | Paul | |
| 6,213,151 B1 | 4/2001 | Jacobson et al. | |
| 6,296,020 B1 | 10/2001 | McNeely et al. | |
| 6,319,469 B1 | 11/2001 | Mian et al. | |
| 6,334,301 B1 | 1/2002 | Otsap et al. | |
| 6,582,662 B1 | 6/2003 | Kellogg et al. | |
| 6,737,026 B1 | 5/2004 | Bergh et al. | |
| 7,192,559 B2 * | 3/2007 | Chow et al. | 422/100 |
| 7,351,376 B1 * | 4/2008 | Quake et al. | 422/100 |
| 2002/0012616 A1 * | 1/2002 | Zhou et al. | 422/130 |
| 2002/0037499 A1 * | 3/2002 | Quake et al. | 435/5 |
| 2002/0048536 A1 | 4/2002 | Bergh et al. | |

FOREIGN PATENT DOCUMENTS

EP      1001846  B1    7/2002

* cited by examiner

*Primary Examiner*—Brian R Gordon
(74) *Attorney, Agent, or Firm*—Senniger Powers LLP

(57) ABSTRACT

A microfluidic fluid distribution manifold includes a common port and a plurality of fluidic channels spirally wound around the common port. Each fluidic channel connects the common port to an independent port and provides essentially the same flow resistance to a fluid flowing therethrough. A fixture for the flow restrictor allows fluid flows to be communicated between the flow restrictor and a larger system such as a parallel reactor system.

24 Claims, 11 Drawing Sheets

FIGURE 3C
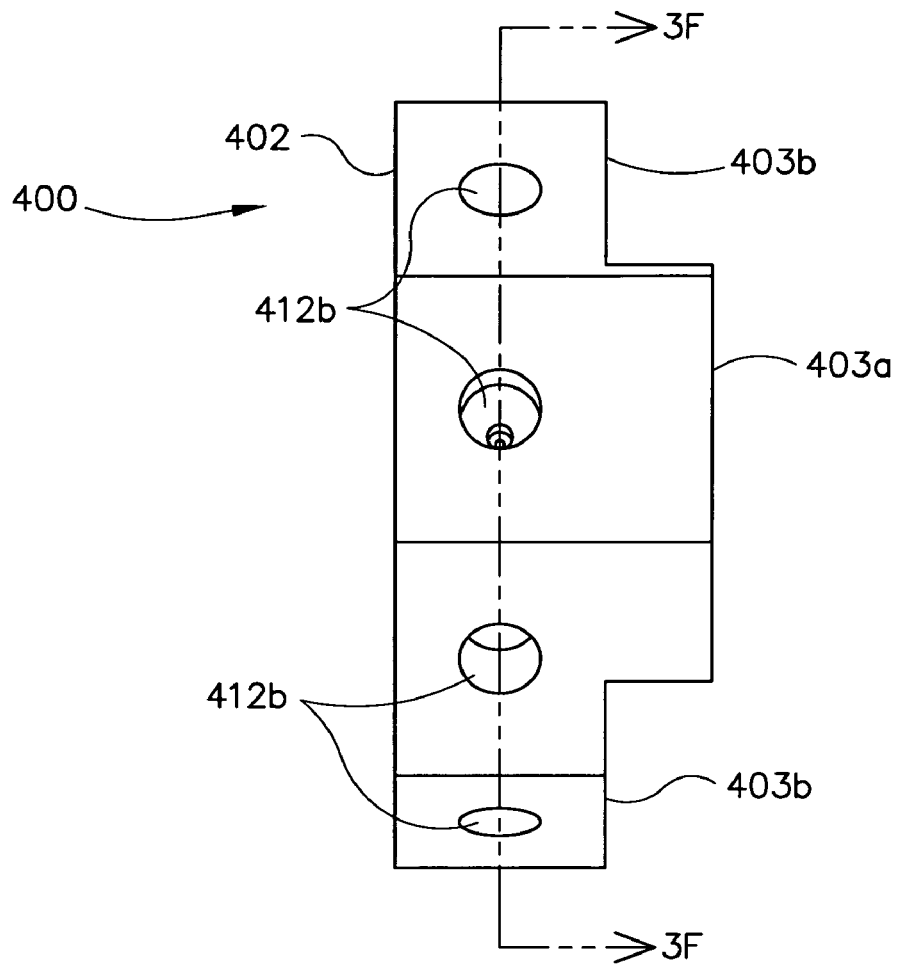
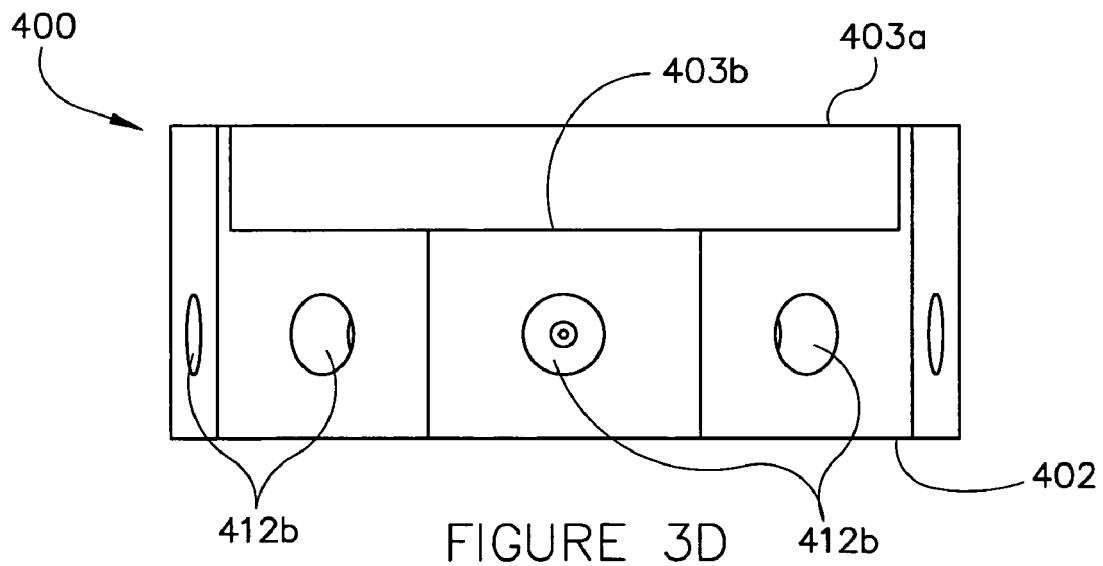
FIGURE 3D

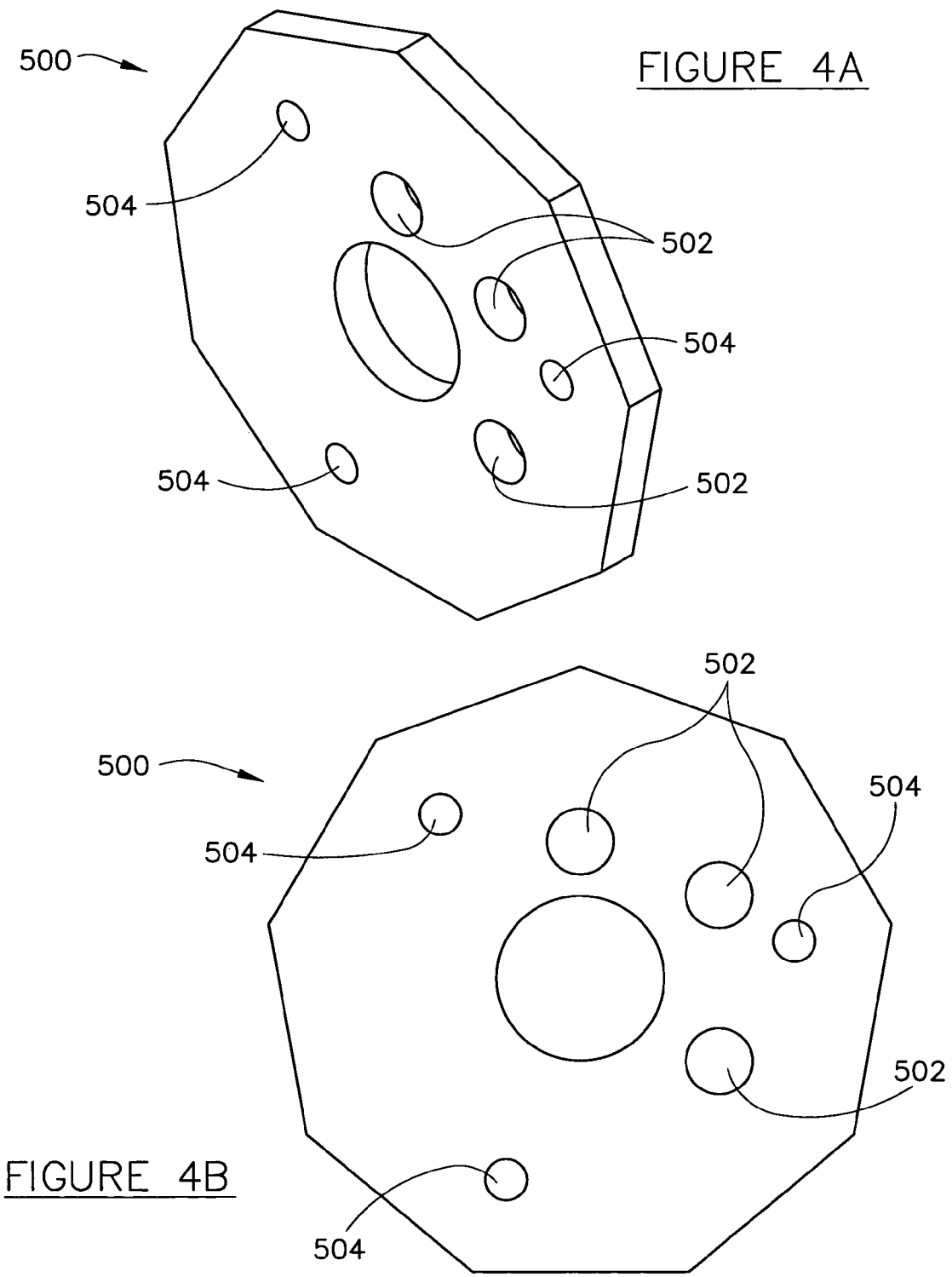

FIGURE 6B
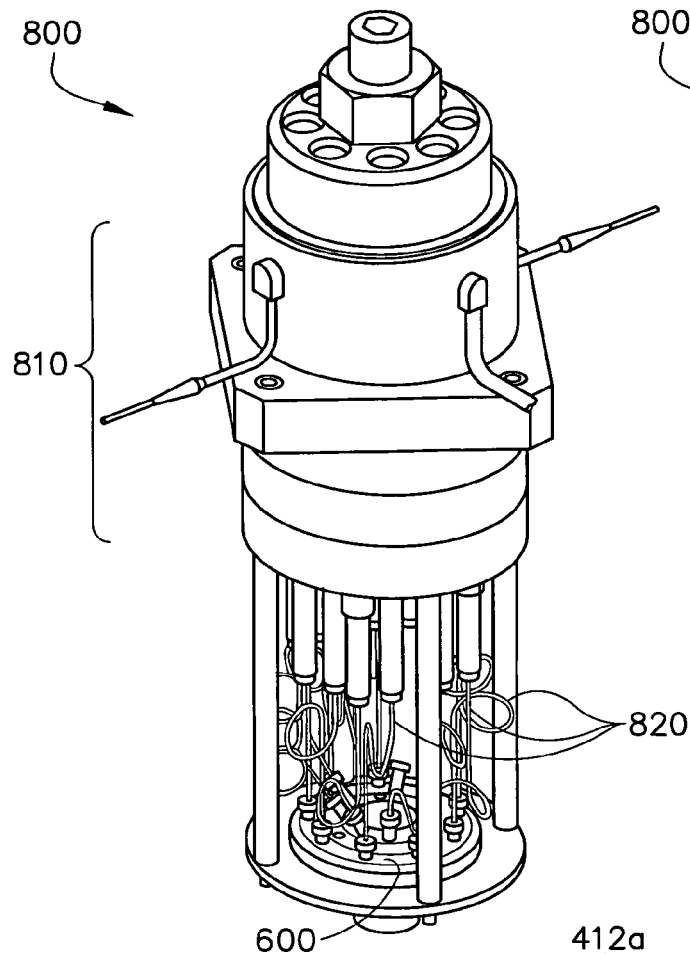
FIGURE 6C
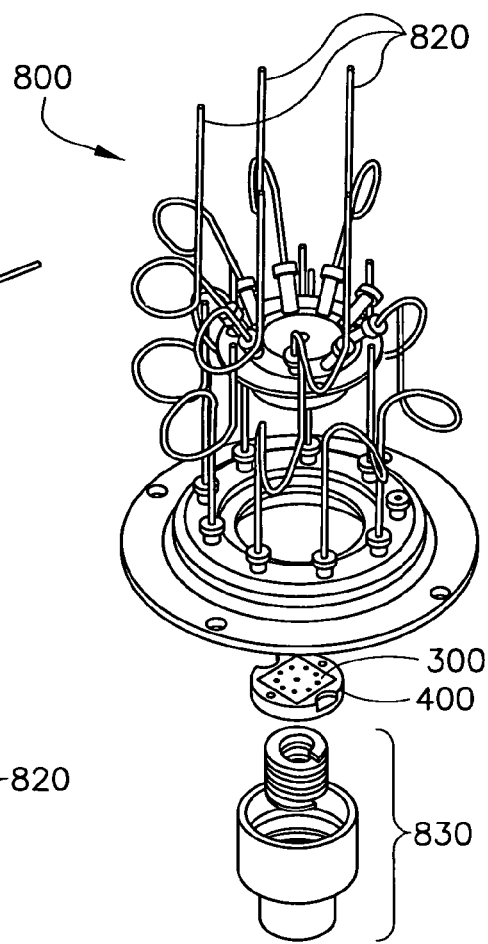
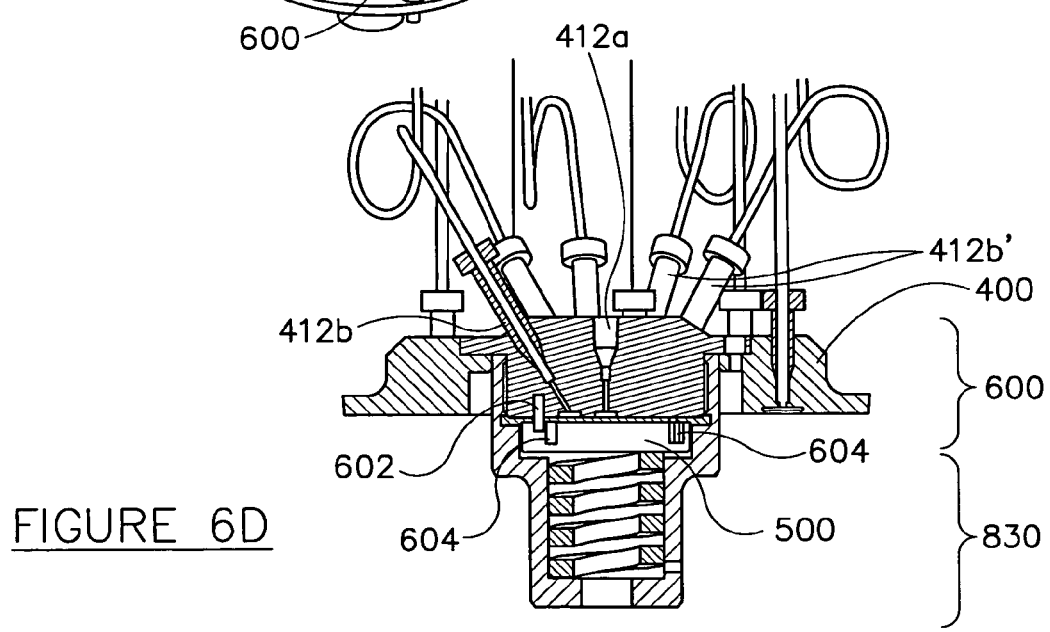
FIGURE 6D

MICROFLUIDIC FLUID DISTRIBUTION MANIFOLD FOR USE WITH MULTI-CHANNEL REACTOR SYSTEMS

FIELD OF THE INVENTION

The present invention relates to microfluidic fluid distribution manifolds useful for splitting or combining fluid streams, particularly in applications involving parallel fluid flow systems, such as are commonly employed in the field of combinatorial or high-throughput materials science.

BACKGROUND OF THE INVENTION

Combinatorial materials science seeks to rapidly screen large numbers of materials for important characteristics in order to discover commercially valuable new materials. A typical combinatorial experiment starts with the creation of a library of materials to be tested followed by an analysis of those materials. The library of materials can include from several materials to thousands of materials, where the materials typically vary by composition, though they can additionally or alternatively vary by other parameters such as grain size, particle size, porosity, phase, isotope ratio, surface treatment, and so forth. The analysis that is applied to the library of materials depends on the property or characteristic of interest. For example, to identify materials in a library that are suitable to be used as catalysts, the members of the library can be analyzed by bringing each member into contact with a reactant or reactants in a suitable reaction chamber and then analyzing the products of the reaction.

Fluid distribution systems for such parallel systems are known in the art. See for example, U.S. Pat. No. 6,149,882 disclosing passive fluid distribution systems generally comprising flow restrictors such as capillaries, orifices and micromachined channels. See also U.S. Pat. No. 6,737,026 disclosing microfluidic fluid distribution systems comprising binary-tree and three-dimensional distribution systems. See also U.S. Publication No. 2002-0048536 disclosing various schema involving microfluidic fluid distribution manifolds for selectively controlling fluid feed flowrates, feed compositions, and feed pressures. Others have disclosed microfluidic fluid distribution systems involving fluidic channels have irregularly-varied geometries.

SUMMARY OF THE INVENTION

The invention includes devices, systems and methods comprising microfluidic fluid distribution manifolds for use as microfluidic flow splitters and/or as microfluidic flow combiners.

BRIEF DESCRIPTION OF THE DRAWINGS

FIG. 3A-3F show views of an exemplary support member for a fluidic chip according to an embodiment of the invention.

FIGS. 4A and 4B show views of an exemplary top member for securing a fluidic chip to a support member according to an embodiment of the invention.

FIGS. 6A through 6D show various views of parallel reactor systems of the invention, including a first system in a schematic view (FIG. 6A), and an alternative second system in a perspective view (FIG. 6B), exploded perspective view (FIG. 6C) of the feed distribution subsystem therof, and a detailed cross-sectional view (FIG. 6D) of a portion of the feed distribution subsystem thereof.

DETAILED DESCRIPTION OF THE INVENTION

Figure 1A:
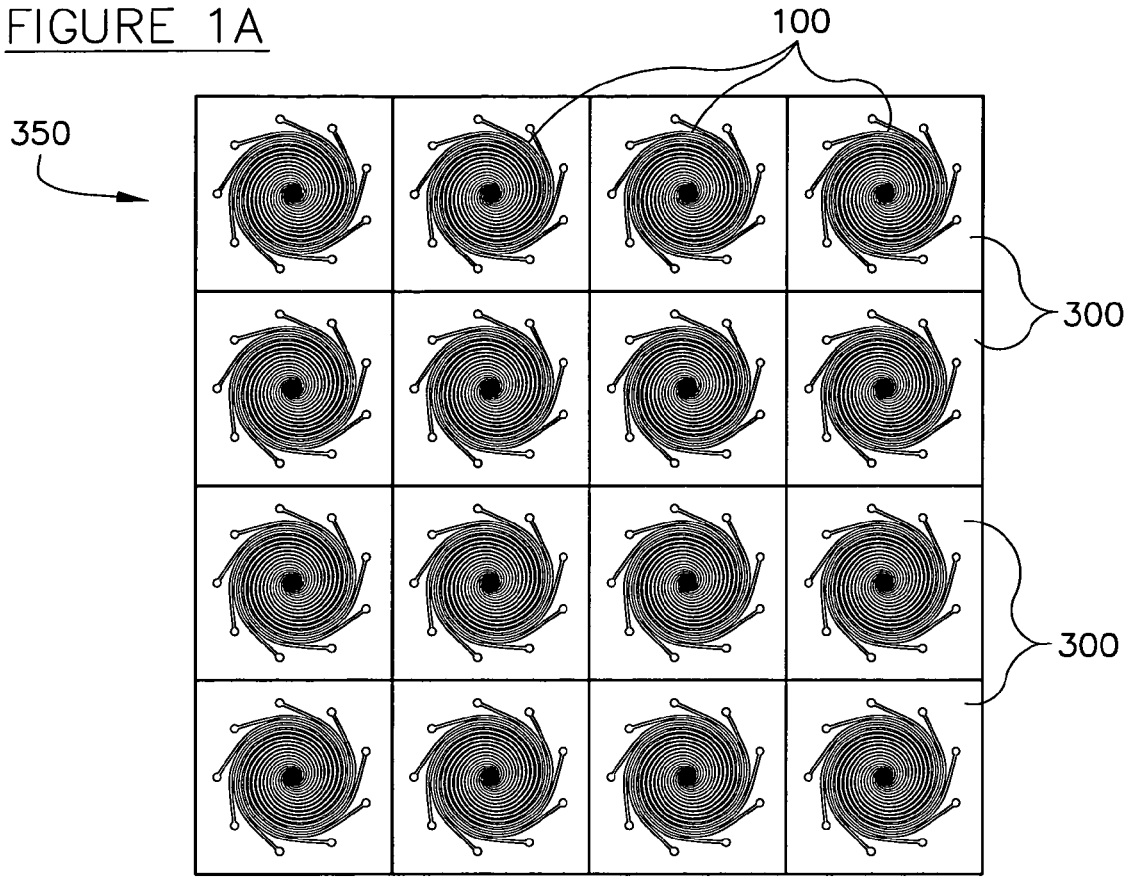
FIGS. 1A through 1C depict schematic diagrams (FIGS. 1A and 1B) or photographs (FIG. 1C) of a microfluidic fluid distribution manifold comprising fluidic channels according to an embodiment of the invention.

The invention includes devices, systems and methods comprising microfluidic fluid distribution manifolds for use as microfluidic flow splitters and/or as microfluidic flow combiners.

General Overview

The present invention is generally directed, in one aspect to devices comprising microfluidic fluid distribution manifolds for use as microfluidic flow splitters and/or as microfluidic flow combiners. In a first general embodiment [A] of this aspect of the invention, the microfluidic fluid distribution manifolds comprise a plurality of spirally interleaved fluidic channels, typically spirally wound around a common port, having a radius of curvature that increases as with increasing distance from the common port. The first general embodiment [A] of the invention is further characterized by one or more additional significant features, relating for example, to particular geometrical configurations of the interleaved fluidic channels, to particular adaptation of the microfluidic fluid distribution manifold to certain operations and/or certain operating conditions, to particular designs offering simplified operations or improved operational capabilities, and to combinations of the foregoing. Each of such additional features are discussed in greater detail below. In a second general embodiment [B] of this aspect of the invention, the microfluidic fluid distribution manifolds comprise one or more microfluidic filters adapted to filter contaminants such as non-fluidic contaminants from a fluid before the fluid is communicated through the plurality of fluidic channels. The second general embodiment [B] of the invention is further characterized by one or more additional significant features, relating for example, to particular locations at which the microfluidic filter is disposed, to geometrical configurations of the microfluidic filters, to operational aspects of the microfluidic filters, and to combinations of the foregoing. Each of such additional features are discussed in greater detail below. In either the first or second general embodiments [A], [B], of this aspect of the invention, the devices can comprise two or more microfluidic fluid distribution manifolds, configured as separate structures or preferably integrated into a common structure.

The present invention is directed, in another aspect, to devices and systems comprising a fixture, for providing a fluidic interface between a microfluidic fluid distribution manifold and macrofluidic fluid distribution components. In a preferred embodiment [C] of this aspect of the invention, the fixture comprises a support member having a first surface for releasably interfacing with a microfluidic fluid distribution manifold, such as the microfluidic fluid distribution manifold of the invention as described in connection with embodiments [A] and [B], and further together with more particular characterizing features thereof. In this embodiment [C], the fixture also includes one or more common fittings and at least a plurality of independent fittings, in each case disposed through the support member. The common fitting has one or more openings adapted for fluid communication with the common ports of the microfluidic fluid distribution manifold, and is further adapted for sealingly engaging a macrofluidic supply or discharge, such as a conduit. Each of the plurality of independent fittings has an independent opening adapted for fluid communication with the independent ports of the microfluidic fluid distribution manifold, and is further adapted for sealingly engaging a macrofluidic discharge or supply, such as a conduit. Additional features of this embodiment [C] are discussed in greater detail below, including for example, a particularly preferred embodiment [C1] comprising an assembly or system including the aforementioned fixture in combination with the aforementioned microfluidic fluid distribution manifolds [e.g., as embodied in [A] and/or [B] or more particularly characterized embodiments thereof]. In this aspect of the invention, the devices can comprise fixtures (alone or with manifolds) configured for releasably engaging two or more microfluidic fluid distribution manifolds, configured as separate structures or preferably integrated into a common structure.

The invention is directed, in a further aspect, to a system for use in evaluating, preferably simultaneously evaluating, a plurality of catalysts (preferably four or more catalysts). In a preferred embodiment [D], such catalyst evaluation system generally comprises at least one fluid source (e.g., for feeding gaseous or liquid reactants), a plurality of flow reactors (e.g., microreactors), at least one effluent sink (e.g., for receiving gaseous or liquid reaction products and/or unreacted reactants), and a microfluidic fluid distribution manifold providing fluid communication between the at least one fluid source and the reactors and/or between the reactors and the at least one effluent sink. The microfluidic fluid distribution manifold of this embodiment [D] can be as described in connection with embodiments [A] and [B], and further together with more particular characterizing features thereof. The microfluidic fluid distribution manifold can be releasably secured in a fixture, such as described in connection with embodiments [C], and further together with more particular characterizing features thereof. This embodiment [D] can further comprise one or more analytical measurement systems for evaluating reaction products and/or unreacted reactants in the reaction cavity and/or in a reactor effluent stream or sample thereof.

The invention is directed as well, in additional aspects, to various methods, including methods for splitting a fluid stream, and/or methods for combining a fluid stream. In a first general embodiment [A] of this aspect of the invention, the methods involve feeding fluids and/or discharging fluids using microfluidic fluid distribution manifolds comprising a plurality of spirally interleaved fluidic channels, typically spirally wound around a common port, having a radius of curvature that increases as with increasing distance from the common port. The first general embodiment [A] of the invention is further characterized by one or more additional features relating for example, to particular geometrical configurations of the interleaved fluidic channels, to particular adaptation of the microfluidic fluid distribution manifold to certain operations and/or certain operating conditions, to particular designs offering simplified operations or improved operational capabilities, and to combinations of the foregoing. Each of such additional features are discussed in greater detail below. In a second general embodiment [B] of this aspect of the invention, the methods involve feeding fluids and/or discharging fluids using microfluidic fluid distribution manifolds comprising one or more microfluidic filters adapted to filter contaminants such as non-fluidic contaminants from a fluid before the fluid is communicated through the plurality of fluidic channels. The second general embodiment [B] of the invention is further characterized by one or more additional features relating for example, to particular locations at which the microfluidic filter is disposed, to geometrical configurations of the microfluidic filters, to operational aspects of the microfluidic filters, and to combinations of the foregoing. Each of such additional features is discussed in greater detail below.

The methods of the invention can also include applied methods, in which fluid streams are split and/or fluid streams are combined using devices comprising microfluidic fluid distribution manifolds, such as described in the aforementioned various embodiments (e.g., [A], [B], [C], [E]). For example, in one embodiment [F], such flow-splitting and/or flow-combining methods can be applied to methods for evaluating a plurality of catalysts, preferably simultaneously using a parallel reactor system. In another embodiment [G], flow-splitting methods can be applied to methods for forming a plurality of two-phase fluids, such as liquid-liquid fluids (e.g., a dispersed liquid phase in a continuous liquid phase media, such as liquid-liquid emulsions), gas-liquid fluids (e.g., bubbling a dispersed gas phase through a continuous liquid phase media), and liquid-gas fluids (e.g., atomizing a dispersed liquid through a continuous gas phase media). In this embodiment, for example, a first fluid of a first phase can be split using a first microfluidic fluid distribution manifold, a second fluid of a second phase can be split using a second microfluidic fluid distribution manifold, and the resulting independent first-phase fluid streams and the resulting independent second-phase fluid streams can be combined to form the plurality of two-phase fluids.

Various general features of the invention, as well as various particular characterizing features of the inventions [e.g., A1-A5] are described hereinafter. Although described in individual separate paragraphs for practicality and convenience, such general features and/or various particular characterizing features can be applied and considered in connection with each of the aforementioned aspects of the invention and with each of the aforementioned embodiments of the invention, alone and in each and every possible permutation and combination, without limitation. As such, the inventions can be defined, in each of the aforementioned aspects, as including all possible permutations and combinations of such general features and/or such particular characterizing features.

Microfluidic Fluid Distribution Manifold

Generally, the microfluidic fluid distribution manifolds of the invention comprise a common port, four or more independent ports, and four or more fluidic channels, each of the four or more fluidic channels providing fluid communication between the common port and a respective one of the four or more independent ports. In operation as a flow splitter, a single fluid stream is received at the common port, communicated through the four or more fluidic channels, and discharged as separate split fluid streams through a respective one of the four or more independent ports. In operation as a flow combiner, four or more independent fluid streams are received at the respective four or more independent ports, communicated through the four or more fluidic channels, and discharged as a combined fluid stream through the common port.

The microfluidic fluid distribution manifolds are preferably integrally formed in a common structure. In preferred embodiments, the fluid distribution manifold(s) can be integrally formed in a plurality of laminae (i.e., two or more layers) of materials. In preferred embodiments, the fluid distribution manifolds can comprise access ports (e.g., common ports and/or independent ports) and/or fluidic channels that are microfabricated, for example, using micromachining techniques known in the art (e.g., photolithographic techniques or other physical masking techniques in combination with various etching techniques; e.g., microdrilling techniques, etc.).

The particular sizes of the access ports (e.g., common ports and/or independent ports) and/or fluidic channels are not narrowly critical to the invention. In general, however, microfluidic fluidic channels can be distinguished from macrofluidic scale by the size of a smallest cross-sectional dimension of the microfluidic channel. The microfluidic fluidic channels can have a smallest cross-sectional dimension of not more than about 1 mm, preferably not more than about 0.5 mm, more preferably not more than about 0.2 mm and most preferably not more than about 0.1 mm (i.e., not more than about 100 microns). In some embodiments, the microfluidic channels can be even smaller, for example having a smallest cross-sectional dimension of not more than about 70 microns, not more than about 50 microns, not more than about 40 microns, not more than about 30 microns, not more than about 20 microns, not more than about 10 microns, not more than about 7 microns, not more than about 5 microns, not more than about 3 microns, not more than about 2 microns, not more than about 1 micron, not more than about 0.7 micron, not more than about 0.5 micron, not more than about 0.3 microns or not more than about 0.1 microns, depending on the desired design constraints (e.g., desired flowrates, fluid type, etc.). Hence, the smallest cross-sectional dimensions of the microfluidic fluidic channels can range from about 0.1 micron to about 1 mm, preferably from about 0.5 micron to about 0.5 mm and more preferably from about 1 micron to about 100 microns.

The number of independent ports and corresponding fluidic channels (associated with each common port) is likewise not critical. Although generally described herein in embodiments comprising "four or more" fluidic channels associated with four or more independent ports (associated with a given common port), a skilled person will readily understand that the distribution manifolds can comprise fewer fluidic channels and associate independent ports, such as a plurality thereof. A skilled person will also readily appreciate that the distribution manifolds can comprise more fluidic channels and associate independent ports, including for example, six or more, nine or more, fifteen or more, twenty-five or more, fifty or more, seventy or more, ninety or more, or one-hundred or more fluidic channels and associated independent port, in each case, associated with a given common port.

Generally, the microfluidic fluid distribution manifold can be a passive manifold, having an essential absence of flow-control elements [A1] such as pumps and/or valves (e.g., throttle valves) having adjustable restriction passages, and/or other flow-control components such as electrodes (e.g., for electrophoretic pumping) and flow-control circuitry. Fluid flow through a passive manifold can be based on a pressure differential across the fluidic channel. The pressure differential can be established, for example, using an inlet feed from a pressurized source vessel.

Generally, each of the four or more of the fluidic channels can have substantially the same overall resistance to flow [A2]. As such, in passive operation, each of the four or more fluidic channels can comprise fluids having substantially the same flow rate as compared between channels [A2], including for example a flow rate that varies by not more than about 5%, relative to the flow rate of the fluids in others of the fluidic channels (i.e., as compared between channels), preferably not more than about 2.5%, more preferably not more than about 2%, still more preferably not more than about 1.5%, and most preferably not more than about 1%. In some embodiments, the variation in flow rate of the fluid stream in or discharged from the fluidic channel can be not more than about 0.75%, not more than about 0.5% or not more than about 0.25%. Even more stringent tolerances, such as not more than about 0.1% can be effected, provided that suitable analytical techniques are available to discern such stringent flow tolerances as compared between fluidic channels.

Generally, the actual flow rate is not critical, and can depend on the particular fluid type and upon the particular application of interest. For example, in applications involving gas-phase fluids, the flow rate can range substantially from about 0.1 standard cubic centimeters per minute (sccm) to about 1000 sccm. Preferably, the flow rate is at least about 0.1 sccm, at least about 0.5 sccm or at least about 1 sccm. In some embodiments, the flow rate for gaseous fluids can be even higher, including for example, at least about 5 sccm, at least about 10 sccm, at least about 20 sccm, at least about 40 sccm, at least about 50 sccm, at least about 100 sccm, and at least about 500 sccm. In applications involving liquid-phase fluids, the flow rate can range substantially from about 0.1 microliter/min to about 100 ml/min. Preferably, the flow rate for liquid fluid is at least about 50 microliters/min, at least about 100 microliters/min, at least about 200 microliters/min, at least about 0.5 milliliters/min and at least about 1 milliliter/min.

Generally, the geometry of each of the four or more of the fluidic channels can be configured to provides a substantially linear relationship between (a) difference in pressure as measured between the common port and the respective independent port and (b) flow rate within the respective fluidic channel. Preferably, the substantially linear relationship preferably is provided for gaseous fluids at least over a range of flow ranging from about 10 sccm to about 20 sccm, and preferably from about 10 sccm to about 30 sccm.

Generally, the microfluidic fluid distribution manifold can be adapted for operation with liquid fluids or with gaseous fluids. In many preferred applications, the fluid is a gaseous fluid [A3] or a two-phase fluid [A3] comprising a first dispersed phase in a second continuous phase. Such two-phase fluid can comprise, for example, liquid-liquid two-phase fluid, gas-liquid two-phase fluid and liquid-gas two-phase fluid.

Generally, the microfluidic fluid distribution manifold can be adapted for operation with fluids at relatively high temperatures [A4], including for example at temperatures of more than about 100° C., more preferably at temperatures of more than about 150° C., and still more preferably at temperatures of more than about 200° C. In some embodiments, the fluid distribution manifold can be adapted for operation with fluids at even higher temperatures, such temperatures including for example temperatures of more than about 250° C., more than about 300° C., more than about 350° C., more than about 400° C., more than about 450° C., and more than about 500° C., depending for example in each case on the application of interest.

As noted above, in a preferred embodiments [A], the microfluidic fluid distribution manifolds comprise a plurality of spirally interleaved fluidic channels. Generally with respect to such embodiments, the use of a longer fluidic channel as a passive flow restrictor provides for enhanced performance with respect to minimizing channel-to-channel variations in flow. The use of relatively long fluidic channels also provides a basis for achieving a relatively high overall resistance to fluid flow without constraining the cross-sectional dimensions to be too small, and as such, thereby reducing the propensity for plugging of fluidic channels due to non-fluidic contaminants. [A5] Hence, preferably for example, the extent of interleaving/the length of the interleaved fluidic channels, can be represented for example by the number of turns around the common port made by the interleaved fluidic channels, and is preferably greater than that known in the art. Hence, the number of turns around the common port can be more than about 1.1 turns, preferably more than about 1.2 turns, and still more preferably about 1.5 turns. In some embodiments, the number of turns around the common port can be at least about 2.0 turns, preferably at least about 2.5 turns around the common port. In some designs, even higher numbers of turns around the common port can be employed, including for example at least about 4.0 turns, at least about 7.0 turns or at least about 10.0 turns.

As further noted above, in a preferred embodiments [B], the microfluidic fluid distribution manifolds comprise a microfluidic fluid filter. Preferably, the microfluidic filter is disposed upstream (relative to flow direction) of the fluidic channels, and being adapted to filter contaminants such as non-fluidic contaminants (e.g., solid particulates) from a fluid before the fluid is communicated through the fluidic channels. In preferred embodiments, one or more microfluidic filters can be disposed within the common port and/or within one or more of the independent ports. In a particularly preferred embodiment, one or more microfluidic filters can be disposed substantially around the periphery of the common port. Alternatively, one or more microfluidic filters can be disposed within one or more fluidic channels, such as near the entrance region of the fluidic channels. The microfluidic filter can also be disposed near one or more exit regions of the fluidic channels.

Generally, the microfluidic filters are preferably are preferably integrally formed in a common structure with the fluid distribution manifolds. In preferred embodiments, the microfluidic filter(s) can be integrally formed in a plurality of laminae (i.e., two or more layers) of materials. In preferred embodiments, the microfluidic filter(s) can be microfabricated, for example, using micromachining techniques known in the art (e.g., photolithographic techniques or other physical masking techniques in combination with various etching techniques; e.g., microdrilling techniques, etc.). For example, the microfilters can generally comprise filter channels formed between pillars that are relatively short in length (as compared to the fluidic channels). Advantageously, integrally formed filter channels allow for continued effective operations of flow through all fluidic channels, even if one or more filter channels become plugged (e.g., due to a contaminant).

The particular structural geometry and dimensions of the microfluidic filters is not narrowly critical. Generally, the one or more microfluidic filters comprise four or more filter channels (for example being disposed substantially around the periphery of the common port), where each of the four or more filter channels has a smallest cross-sectional dimension that is equal to or smaller than a smallest cross-sectional dimension of the four or more fluidic channels. Hence, if the smallest cross-sectional dimension of a fluidic channel is a width of about 20 microns, then the filter channels of the microfluidic filter preferably have a cross-sectional dimension of not more than about 20 microns. In some embodiments, the filter channels can have a cross-sectional flow area that is smaller than a cross-sectional flow area of the four or more fluidic channels.

The number of filter channels in the microfluidic filter is not of critical significance, but preferably is at least one filter channel. More generally, the at least one microfluidic filter can comprises a number of filter channels, $N_{fc}$ (for example disposed substantially around the periphery of the common port). The number of filter channels, $N_{fc}$, is preferably at least one, more preferably at least two, more preferably still at least three, and most preferably at least four. Generally, the number of filter channels is preferably at least about 1 times or at least about 1.25 times or at least about 1.5 times the number of fluidic channels. Higher ratios of the number of filter channels to the number of fluidic channels can also be used, including a ratio of at least 2:1, at least 2.5:1, at least 3.0:1, at least 5.0:1, at least 7.0:1 or at least 10.0:1.

The geometry of the microfluidic filter (e.g., comprising filter channels) can also be characterized with respect to the relative pressure drop across the microfluidic filter as compared to the pressure drop across a fluidic channel (e.g., as measure from the common port to one of the independent ports of the microfluidic fluid distribution manifold). Preferably, the pressure drop across the microfluidic filter is not more than about 5% of the total pressure drop across one of the fluidic channels as measure from the common port to corresponding one of the independent ports, preferably not more than about 2%, more preferably not more than about 1%. In some embodiments, the pressure drop across the microfluidic filter can be not more than about 0.75%, not more than about 0.5% or not more than about 0.2% or not more than about 0.1%, in each case of the total pressure drop across one of the fluidic channels.

The general and characterizing features described in the aforementioned paragraphs can be combined in various combinations and permutations.

Fixtures

Fixtures for the micromachined flow restrictors provide convenient means for communicating fluid flows between microfluidic fluid distribution manifolds and macroscale fluidic components, such as feed lines or discharge lines associated with a fluidic system, such as a parallel reactor system. Further details of preferred fixtures are described below.

Parallel Reactor Systems

Parallel reactor systems that incorporate the micromachined flow restrictors are easier to configure and benefit from the greater flow uniformity provided by the fluidic channels. Further details of preferred reactor systems are described below.

Preferred Embodiments

Preferred embodiments are described below in connection with the several figures.

Figure 1B:
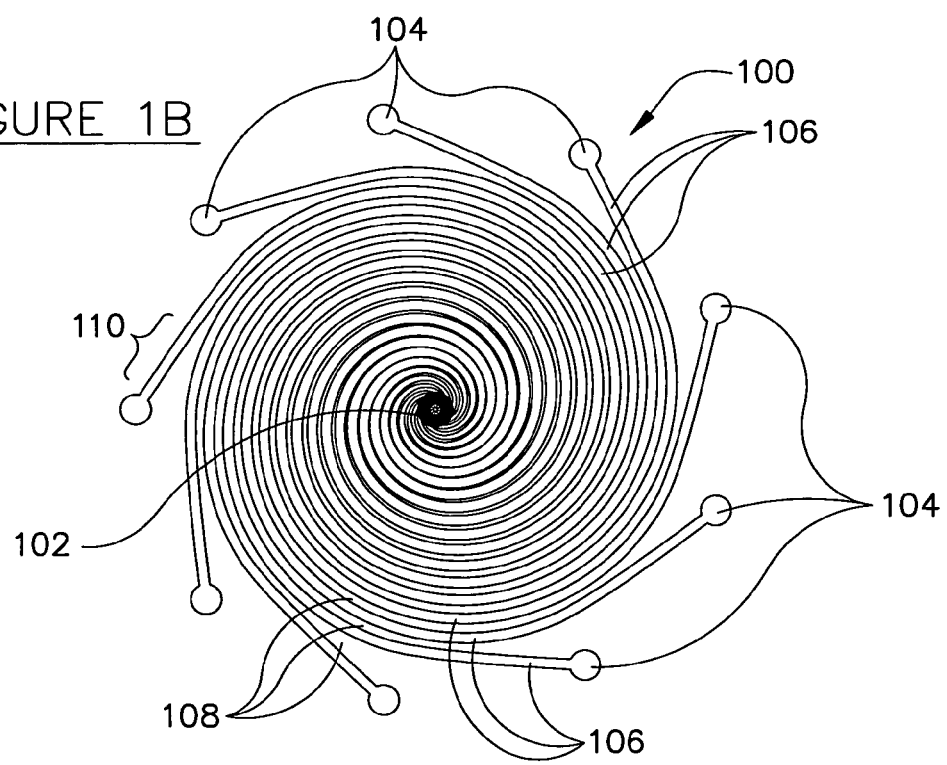
Figure 1C:
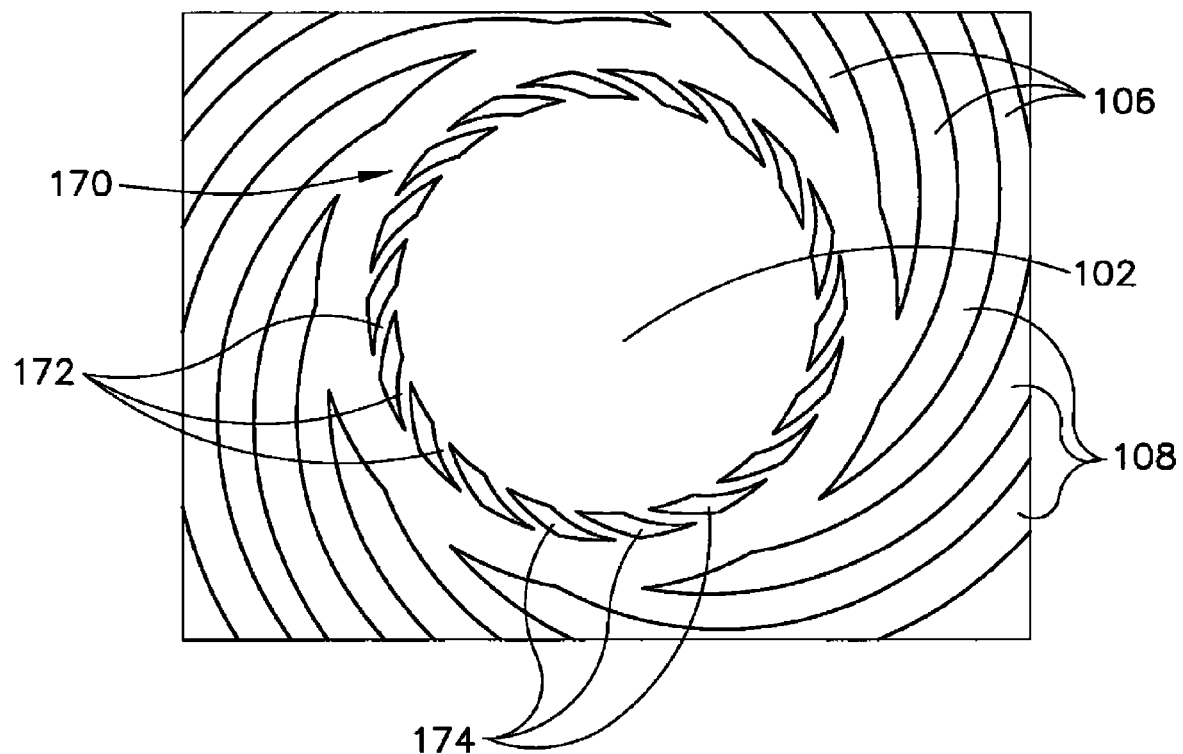

Referring to FIGS. 1A through 1C, a microfluidic fluid distribution manifold 100 can include a common port 102, a plurality of independent ports 104, and fluidic channels 106 that each provide a fluid communication path ("flowpath") between the common port 102 and one of the plurality of independent ports 104. The microfluidic fluid distribution manifold 100 is a device that can be used for microfluidic fluid distribution such as splitting a single fluid stream or combining multiple independent fluid streams. As used for splitting, the single fluid stream is received at the common port 102 and split into independent fluid streams that are discharged through the independent ports 104. As used for combining multiple independent fluid streams, the independent fluid streams are received at the independent ports 104 and are discharged through the common port 102.

The common port 102 is preferably a cavity defining a shaped volume, for example such as a right cylinder or other shaped volume, typically having a central axis and a cross section such as a circular cross section perpendicular to the central axis. Disposed around a periphery (e.g., a circumference) of the cavity are openings, typically each opening leading into one of the fluidic channels 106. Preferably, such openings can be substantially evenly spaced around the periphery (e.g., circumference) of the shaped volume. The shaped volume can have a cross section of any shape, such as a polygon (e.g., decagon, octagon, septagon, hexagon, pentagon, square, rectangle, or triangle), or such as an irregular shape. In one embodiment, the cross section of the shaped volume can be a polygon such that the shaped volume has a plurality of substantially flat walls, or faces, and openings into each of the fluidic channels 106 can be centered on each face of the polygon-shaped volume. In this embodiment, the number of faces on the polygon-shaped volume cavity can be equal to, more than or less than the number of fluidic channels 106. Other variations will be readily apparent to one of ordinary skill in the art. Generally, as noted above, the number of fluidic channels can be essentially any number, but is preferably between 2 and 96, more preferably four or more or 9 or more, more preferably still from 6 to 12, and most preferably 9, as shown in FIGS. 1A through 1C.

The top and bottom ends of the common port 102 are preferably closed, for example with substantially flat surfaces. In order to allow fluid communication to the common port 102, either the top or bottom surface can additionally include an aperture. The aperture can be of any shape, and can be positioned in a location suitable for providing fluid communication with the shaped volume cavity. The aperture is preferably circular and can be centered on the central axis of the cavity. The diameter of the aperture, in some embodiments, can be smaller than or equal to the diameter of the cross section of a cylindrical cavity. Similarly, the independent ports 104 can likewise be of any shaped volume (e.g., such as right cylinders, polygonal volumes or irregularly-shaped volumes), and preferably with tops and bottoms such as substantially flat top and bottom surfaces. Each independent port 104 includes can include one or more openings in the top or bottom surface of in the wall surface for fluid communication with the fluidic channel 106, and an aperture, for example in the top or bottom surface or wall surface, for fluid communication to an external system, such as a flow line of a parallel reactor system. Generally, the same considerations that apply to the common port 102 apply to the independent ports 104, though the dimensions (e.g., diameter) of the common port 102 will typically be greater than the dimensions (e.g., diameter) of the independent ports 104.

Each of the fluidic channels 106 is spirally interleaved relative to the others, and separated from its neighbors by partitions 108, as shown in FIGS. 1A through 1C. In some embodiments, each of the fluidic channels 106 makes at least one complete first turn around the common port 102. Also, each of the fluidic channels 106 has a radius of curvature that increases with increasing distance from the common port 102. Further, each fluidic channel 106 can include a transition segment 110 that extends, generally more linearly from the spirally interleaved portion of the fluidic channel 106, to the independent port 104. Each fluidic channel 106 preferably has substantially the same geometry, namely substantially the same profile in cross-section, substantially the same total length between the common port 102 and the independent port 104, and substantially the same angular rate of radius of curvature change, so that each flowpath defined by a fluidic channel 106 provides the same overall resistance to fluid flow.

In experimental tests, the uniformity between fluidic channels has been measured to better than 0.25% maximum deviation, based on measured flow rates.

More specifically, each of the fluidic channels 106 spirals outward from the common port 102, and accordingly, each fluidic channel 106 has a radius of curvature that increases with increasing distance from the central port 102. Here, distance from the common port 102 can be measured as the radial distance from the fluidic channel 106 to the common port 102, the linear distance as measured along the flowpath of the fluidic channel 106, or the angular distance measured from the beginning of the fluidic channel 106, for example, in radians. In the example shown in FIG. 1B, it is apparent that the partitions 108 between the fluidic channels 106 can preferably have substantially the same width (or height), or slightly increasing width (or height), in each case as a function of distance from the common port 102. Likewise, in some embodiments, the width of the partitions 108 can be substantially the same or can continuously increase with distance from the common port 106. In such embodiments the radius of curvature for the several fluidic channels 106 increases more rapidly as a function of distance. The embodiment shown in FIGS. 1A through 1C is preferred, generally, with respect to maximizing packing density, in that it allows the fluidic channels 106 to be as long as possible within the smallest amount of space.

As noted, each fluidic channel 106 preferably has substantially the same geometry. In some embodiments the cross section of each fluidic channel 106 is substantially rectangular, though in some embodiments the cross section is circular, V-shaped, or trapezoidal. The cross sectional area of each fluidic channel 106 can be constant as a function of distance from the common port 102. In some embodiments, however, the fluidic channels 106 additionally widen, for example near a transition segment 110, such that the area of the cross section increases through the transition segment 110. In such embodiments, increasing the cross section of the fluidic channel 106 serves to decrease the flow rate of the fluid as it approaches the independent port 104. In other embodiments a similar reduction in fluid flow rate can be achieved by gradually increasing the cross section of the fluidic channel 106 over the entire length thereof.

Referring in particular now to FIG. 1C, an enlarged microscopic photograph of the region near the common port 102 of a microfluidic fluid distribution manifold 100 having nine fluidic channels 106 leading to nine corresponding independent ports 104 (not shown in FIG. 1C) is demonstrated. FIG. 1C also depicts a microfluidic filter generally indicated as 170, comprising a plurality of filter channels 172 disposed around the periphery of the common port 102. Filter channels 172 are integrally formed in a wafer layer using microfabrication techniques that form the filter channels 172 between filter pillars 174. In the embodiment shown, the number of filter channels 172 is about 2 times the number of fluidic channels 106. The smallest dimension of the depicted filter channels 172 is the filter channel width, and this is less than the smallest dimensions of the fluidic channel 106. The length of the filter channels 172 is considerably less than the length of the fluidic channels 106, such that the pressure drop across the filter channels 172 is considerably less than the pressure drop across the fluidic channels 106.

Figure 2A:
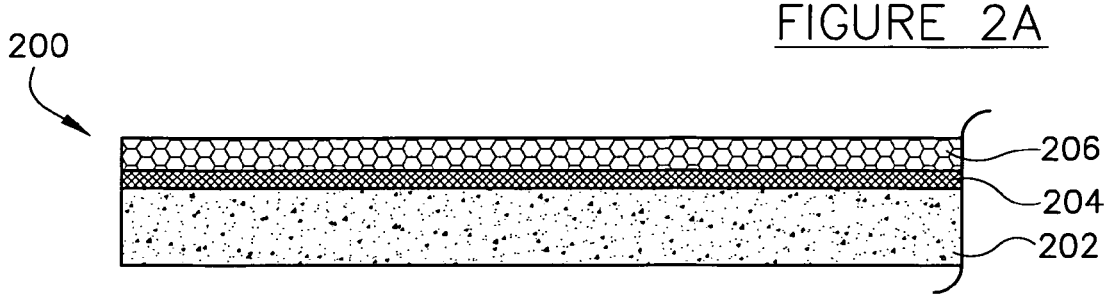
FIGS. 2A-2G illustrate an exemplary method of fabricating a micromachined flow restrictor according to an embodiment of the invention.

FIGS. 2A-2G illustrate an exemplary method of fabricating a microfluidic fluid distribution manifold 100 (FIGS. 1A-1C) having five microfabricated fluidic channels 106, each suitable for use a as a passive flow restrictor, according to an embodiment of the invention that involves known microfabrication technologies and materials. It will be appreciated, however, that microfluidic fluid distribution manifolds 100 of the invention can also be produced by other known microfabrication techniques such as imprint molding techniques, among others. According to the illustrated method, as shown in FIG. 2A, a wafer 200 such as a silicon-on-insulator (SOI) substrate is initially provided. The wafer 200 can include a base layer 202, a stop-etch layer 204 above the base layer 202, and a channel layer 206 above the stop-etch layer 204 that can be pattered according to well known processes, such as photolithography, with a design corresponding to the desired design of the fluidic channels 106 (FIGS. 1A-1C). The base layer 202 is preferably a relatively thick layer to provide mechanical integrity and can be, for example, a layer of silicon. The stop-etch layer 204 can be, for instance, a thin silicon dioxide ($SiO_2$) layer, and the channel layer 206 can be, for example, a relatively thin layer of silicon. A representative thickness for the base layer 202 is about 450μ, a representative thickness for the stop-etch layer 204 is about 2μ, and a representative thickness for the channel layer 206 is about 60μ. It will be appreciated, however, that other materials and other layer thicknesses can be employed, and in particular the thickness of the channel layer 206 can be selected to determine the height of the several fluidic channels 106 and the ports 102 and 104.

Figure 2B:
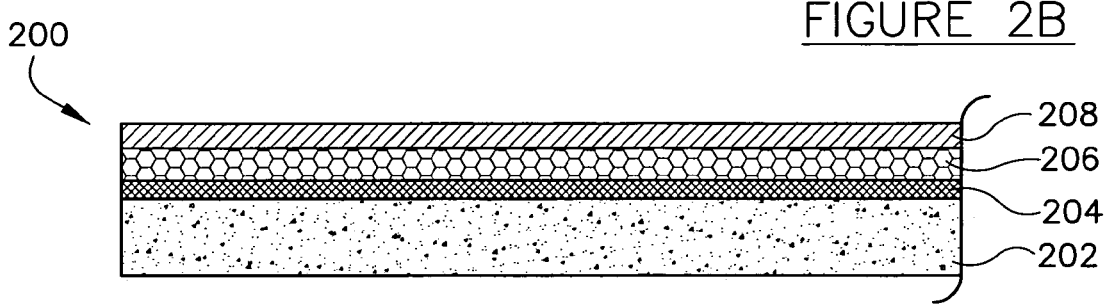
Figure 2C:
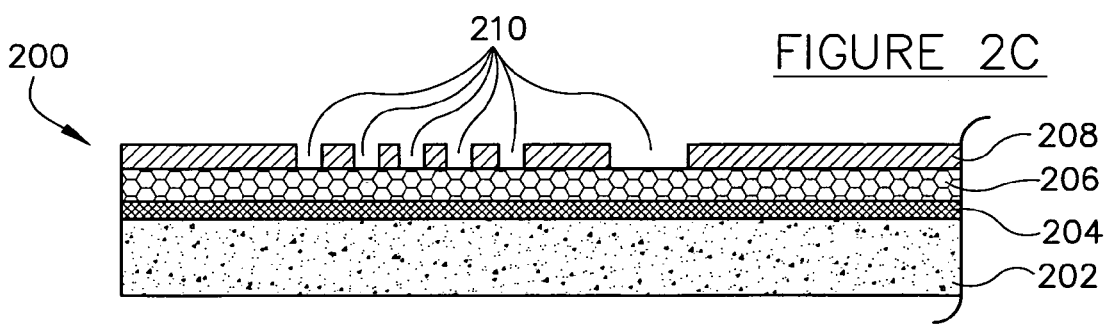
Figure 2D:
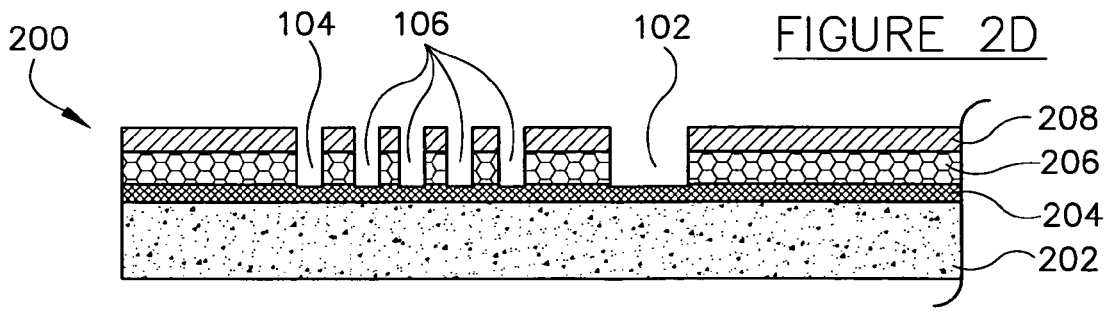

FIGS. 2B-2D illustrate a method of patterning the pattern layer 206. As shown in FIG. 2B, a patterning layer 208, such as a layer of photoresist, can be formed above the pattern layer 206, for example, by spin coating. As seen in FIG. 2C, the patterning layer 208 is next patterned, for example by exposure to an illumination that itself has been patterned with a mask that includes an image of the desired fluidic channels 106 and the ports 102 and 104. Patterning the patterning layer 208 creates openings 210 in the patterning layer 208 that correspondingly expose the underlying pattern layer 206 where the desired fluidic channels 106 and the ports 102 and 104 are to be created (FIG. 1C). Thereafter, as shown in FIG. 2D, the fluidic channels 106 and the common ports 102 and independent ports 104 are defined in the channel layer 206, for instance, by wet chemical etching. Although described herein with regard to positive photoresist techniques, negative photoresist techniques can also be employed. Exemplary lengths for fluidic channels 106 range from about 35 mm to about 70 mm, though fluidic channels 106 can be much shorter or longer as needed. Exemplary widths of fluidic channels 106 range from about 50μ to about 200μ, though here, too, the widths can be much thinner or wider as needed. Exemplary heights are determined in the above-described fabrication process by the thickness of the channel layer 206, and can range from about 1 micron to about 500 micron, preferably from about 1 micron to about 200 microns, more preferably from about 2 microns to about 150 microns, and most preferably from about 5 microns to about 100 microns.

Figure 2E:
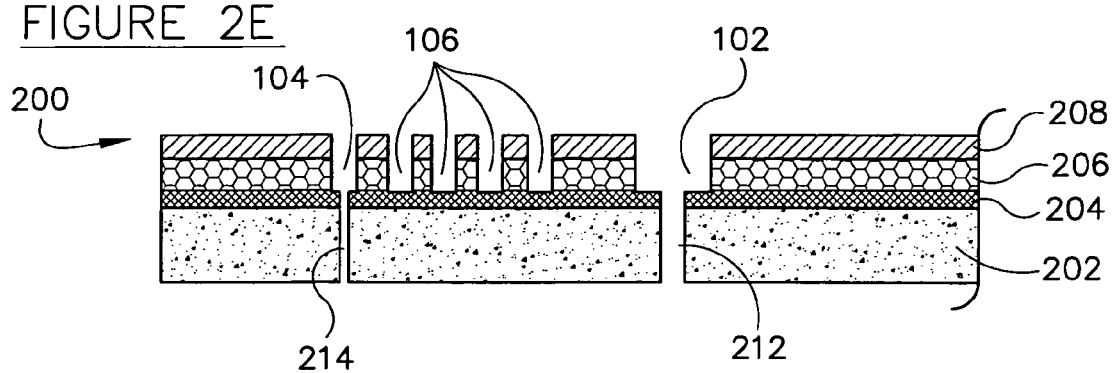
Figure 2F:
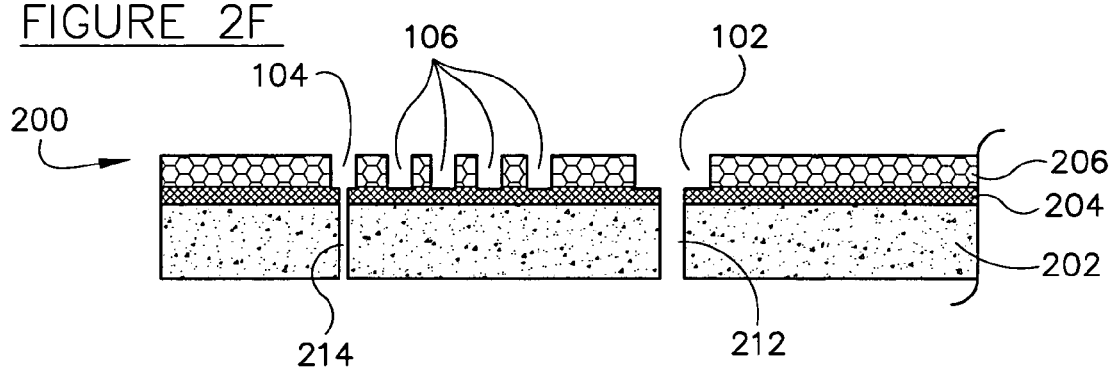
Figure 2G:
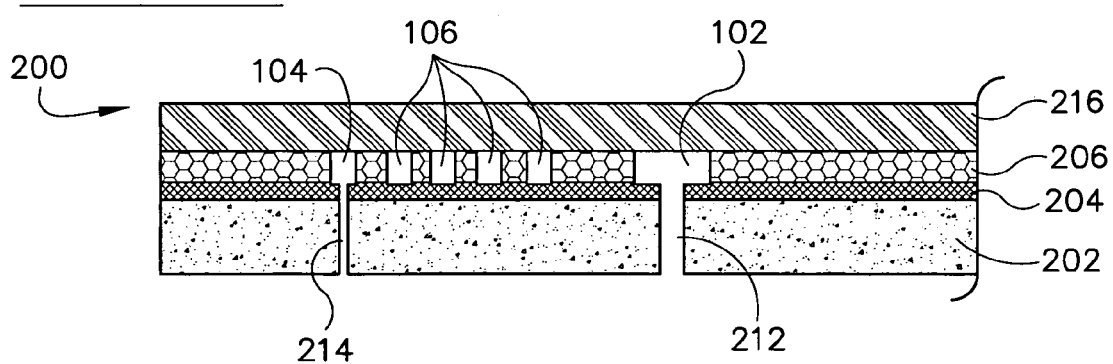

FIGS. 2E-2G illustrate a method of completing the microfluidic fluid distribution manifold 100. In FIG. 2E an aperture 212 is added to the common port 102, and apertures 214 are added to the independent ports 104. The apertures 212, 214 can be created, for example, by laser drilling through the stop-etch and base layers 204, 202. In FIG. 2F the patterning layer 208 is removed, for example, by a stripping process. It will be appreciated that in some embodiments stripping the patterning layer 208 will occur after the apertures 212, 214 are formed, while in other embodiments this order is reversed. In FIG. 2G a capping layer 216 is added to form a top surface for the fluidic channels 106 and the ports 102 and 104. In some embodiments the capping layer 216 is a borosilicate glass such as Pyrex 7740 that is anodically bonded to the pattern layer 206. It will be appreciated that either or both of the aperture 212 and the apertures 214 may be defined in the capping layer 216 rather than through the stop-etch and base layers 204, 202. This can be achieved, for example, by pre-drilling in the capping layer 216 prior to bonding to the pattern layer 206.

Figure 2H:
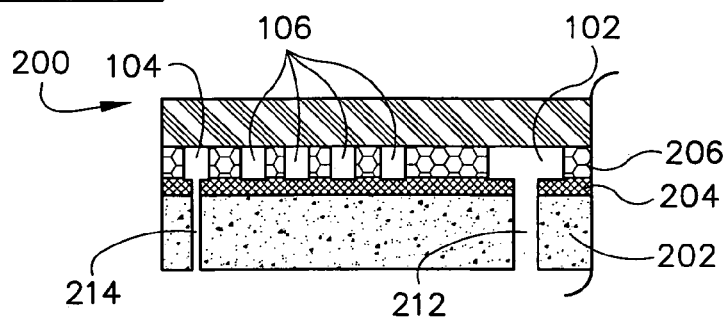
FIG. 2H illustrates one individual fluid manifold produced according to the method illustrated in FIGS. 2A-2G.

If desired, multiple microfluidic fluid distribution manifolds can be microfabricated on a common wafer 350 or wafers (e.g., common SOI wafer as described above), as shown in FIG. 1A, and individual microfluidic fluid distribution manifolds 100 can be diced from the common wafer 350 (e.g., see FIG. 2H). FIG. 1A illustrates the ability to scale the fabrication process described above with reference to FIGS. 2A-2G in order to manufacture multiple microfluidic fluid distribution manifold s 100 in parallel. In the embodiment shown in FIG. 1A, it can be seen that each microfluidic fluid distribution manifold 100 is essentially centered on a fluidic chip 300, with multiple fluid chips 300 on a common wafer 350. While it is generally preferable to manufacture multiple identical fluidic chips 300, it will be appreciated that some or all of the fluidic chips 300 can be different and can vary in the numbers of fluidic channels 106, the lengths and cross sections thereof, the dimensions of the ports 102, 104, and so forth. Fluidic chips 300 can be separated from one another, for example, by conventional dicing techniques that are commonly used to separate integrated circuits from a common wafer. In experimental tests, the splitting uniformity between fluidic chips from the same wafer has been measured to better than 0.13% at 1 standard deviation.

Figure 3A:
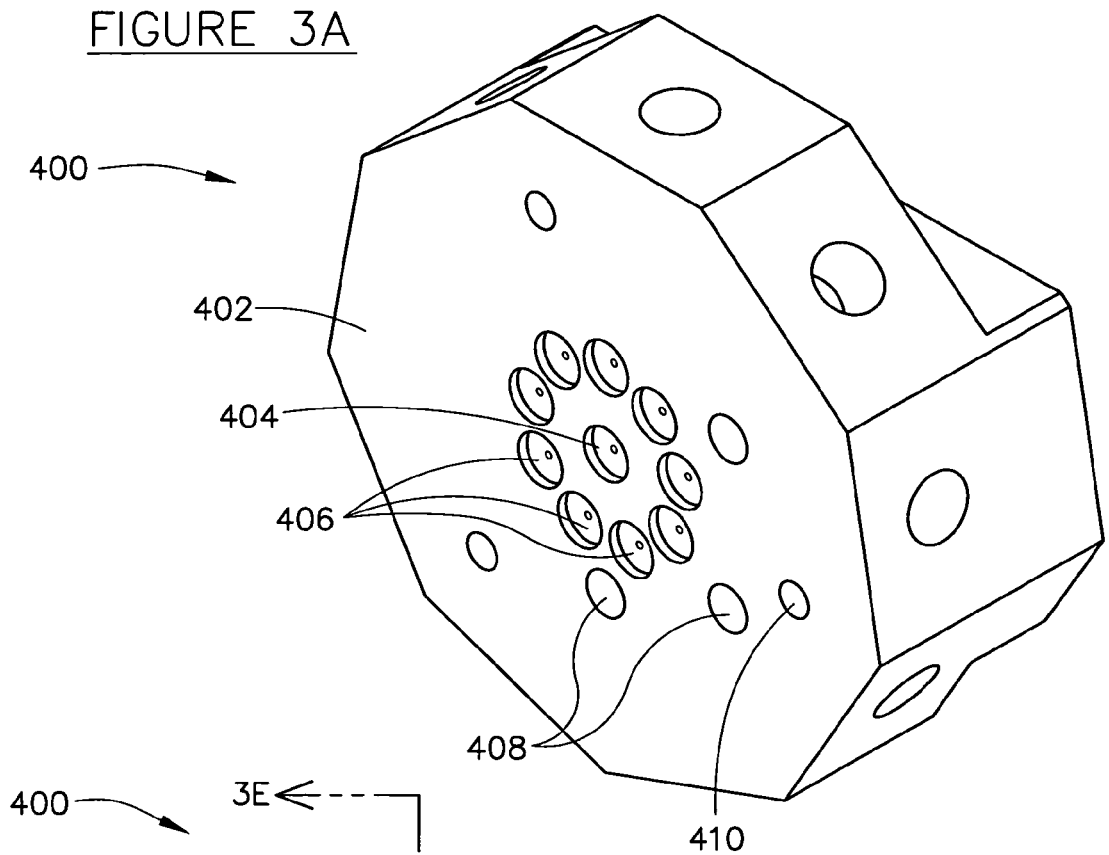
Figure 3B:
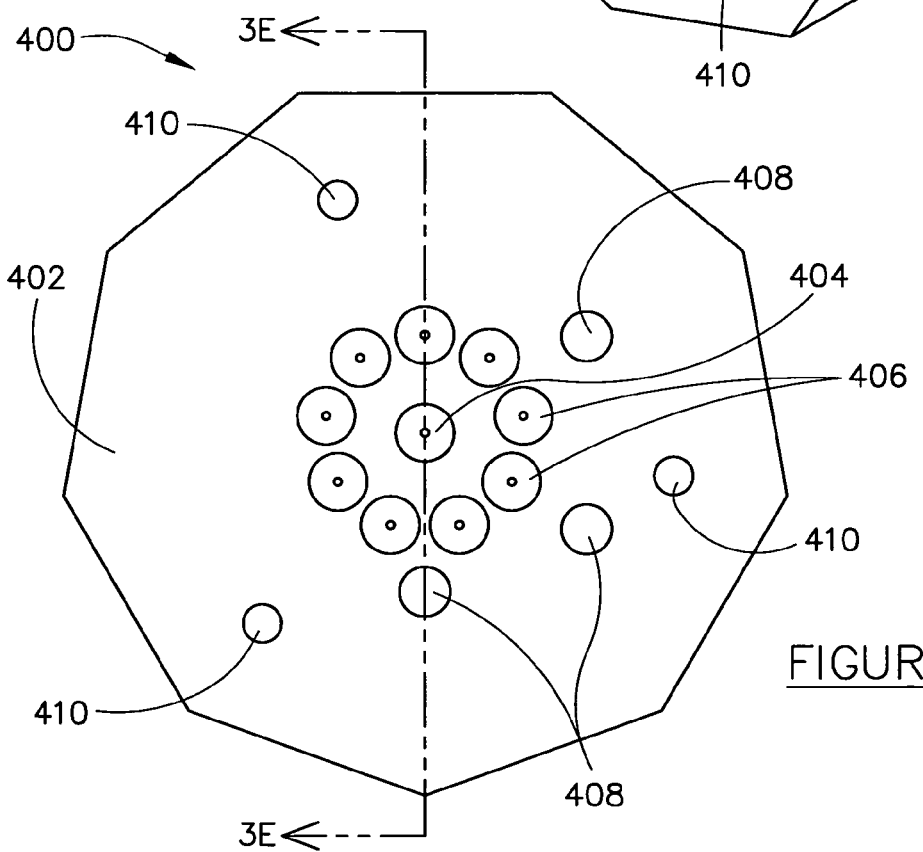
Figure 3E:
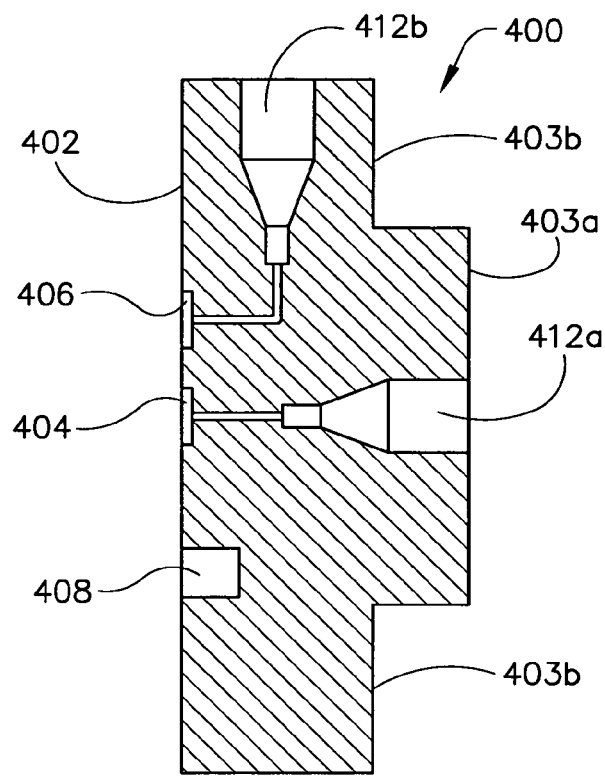
Figure 3F:
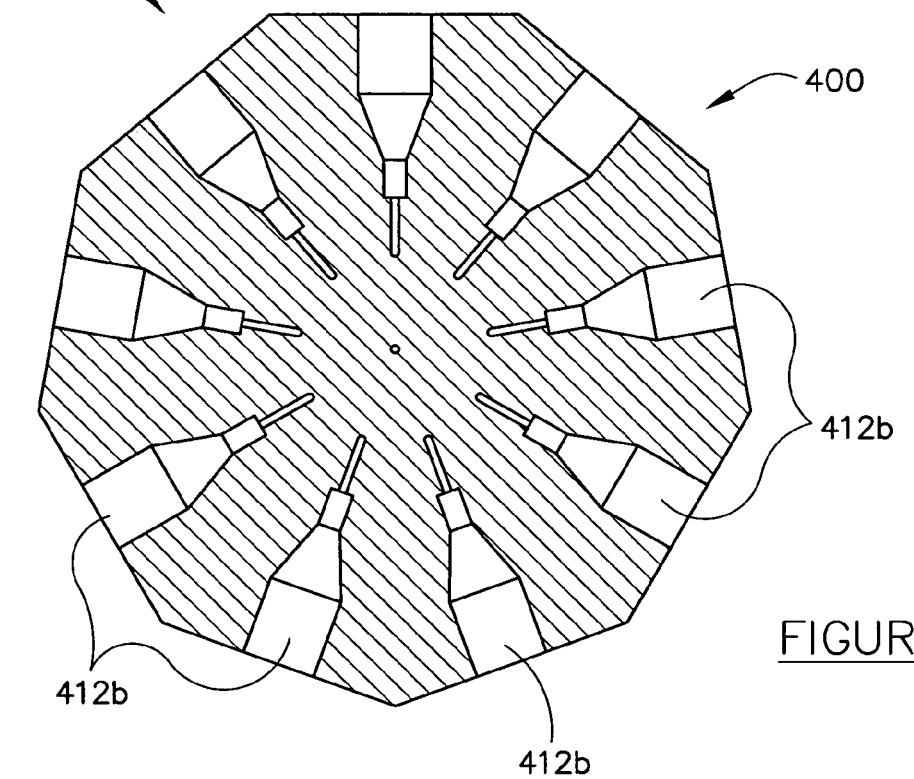
Figure 6A:
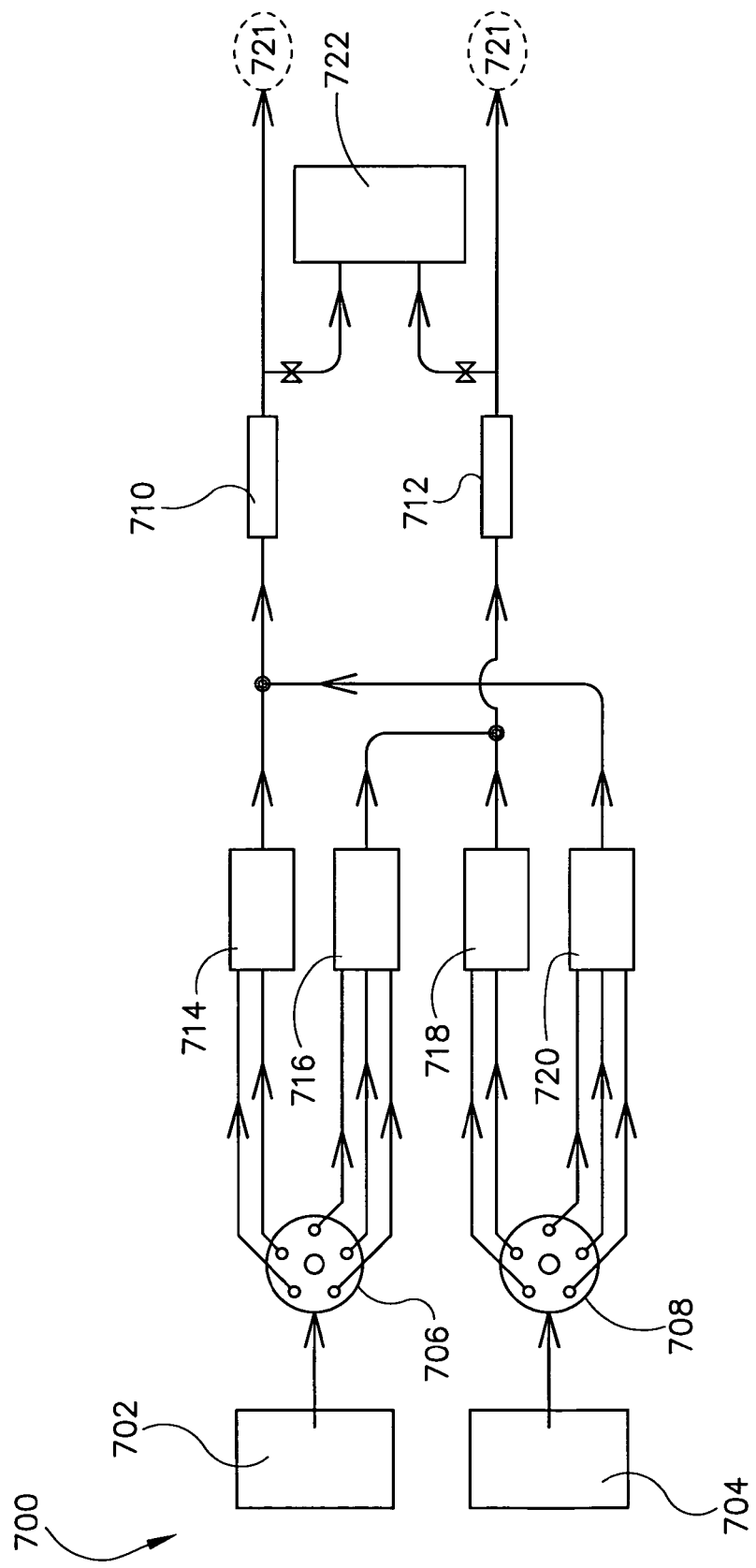

FIGS. 3A-3F show views of an exemplary support member 400, and FIGS. 4A and 4B show views of an exemplary top member 500, that together form a fixture 600 (see FIGS. 6B and 6D) for integrating a fluidic chip 300 (FIG. 1A) into a larger system such as a parallel reactor system 700 (FIG. 6A) or 800 (FIGS. 6B and 6C). More specifically, FIG. 3A shows a perspective view of support member 400, FIG. 3B shows a top view of support member 400, FIG. 3C shows one side view of support member 400, FIG. 3D shonws another side view of support member 400, taken orthogonally to the side view of FIG. 3C, FIG. 3E shows a cross sectional view through support member 400 taken along the line 3E-3E in FIG. 3B, and FIG. 3F shows another cross sectional view through support member 400 taken along line 3F-3F in FIG. 3C. As can be seen from these various drawings, support member 400 includes a substantially flat first surface 402 that can releasably engaged with in face-to-face abutted relationship against an exposed surface of the fluidic chip 300. Support member 400 further includes one or more second surfaces 403a, 403b generally opposed to the first surface 402 of the support member 400. The support can also include one or more edge surfaces. Support member 400 also includes a central opening 404 for fluid communication with aperture 212 and independent openings 406 for fluid communication with apertures 214. Support member 400 additionally includes alignment pin receptacles 408 and screw holes 410 for attaching the top member 500. (FIGS. 4A and 4B).

Preferably, support member 400 is fabricated from a material that is both readily machinable and resistant to corrosion, such as stainless steels, and surface 402 can be polished so that the fluidic chip 300 can be situated substantially flush against this surface 402. The independent openings 406 are evenly arranged around the central opening 404 to match the positions of the apertures 214 of the microfluidic fluid distribution manifold 100 on fluidic chip 300. Within each opening 404, 406 an appropriately sized o-ring (not shown) or other sealing means (e.g., such as a gasket sheet having apertures for the openings) is preferably positioned prior to assembly of the fixture 600 to sealingly engage the microfluidic fluid distribution manifold with the support member 400 of the fixture 600, and to thereby substantially prevent fluid leakage under the operational conditions (e.g., temperatures, pressures) of interest.

As can be seen from FIG. 3A through 3F, the support member 400 can also include fittings (generally indicated as 412), such as common fitting 412a and a plurality of independent fittings 412b, to reliably connect and disconnect the support member 400 to fluid lines of macrofluidic components of a larger system, for example, reactors, manifolds, sources of reactants, or to other microfluidic fluid components such as other microfluidic fluid distribution manifolds 100. Fittings 412 can be threaded or quick-connect, for instance, depending on the type of attachment on the (typically macroscale) input and output lines to which the fittings 412 will be joined. Each fitting 412 connects through the body of the support member 400 to either the opening 404 or one of the openings 406, as shown for example in FIG. 3E.

FIGS. 4A and 4B show, respectively, a perspective view and a top view of the top member 500. As can be seen, top member 500 includes alignment pin holes 502 and screw holes 504 that are respectively aligned with alignment pin receptacles 408 and screw holes 410 of the support member 400. The assembly of the fluidic chip 300 into a fixture 600 can include a releasably engagable assembly, such as is shown in FIG. 6D. First, pins 602 are placed into alignment pin receptacles 408 and then the fluidic chip 300 is pushed up against the alignment pins 602 to achieve the proper alignment of the fluidic chip 300 to the openings 404, 406. Thereafter, the top member 500 is placed over the fluidic chip 300 such that the alignment pins 602 project through the pin holes 502. Next, the top member 500 is secured to support member 400 with a series of screws 604 that are threaded through screw holes 504 and into screw holes 410. If desired, alignment pins 602 may be withdrawn to avoid restriction by pins 602 with respect to thermal expansion of the fluidic chip 300.

Once the fixture 600 has been configured with a fluidic chip 300, in put and output lines can be connected to fittings 412. It will be appreciated that fittings 412 can be conveniently sealed or plugged rather than attached to output lines to reduce the number of fluidic channels 106 of the microfluidic fluid distribution manifold 100 that are utilized. Further, although not shown, it will be apparent that two or more output lines connected to two or more fittings 412b can be joined together to form a single line that carries the fluid flow from multiple fluidic channels 106. Accordingly, a microfluidic fluid distribution manifold 100 having 9 fluidic channels 106 as shown in FIGS. 1A through 1C can be configured in many ways, with considerable flexibility. For example, such a microfluidic fluid distribution manifold can be configured with a support member 400 having one fitting 412b plugged, one fitting 412b to direct the flow of one fluidic channel 106 to a first reactor, two fittings 412b joined together to direct the flow of two fluidic channels 106 to a second reactor (for twice as much flow rate relative to the first reactor), and three fittings 412b joined together to direct the flow of three fluidic channels 106 to a third reactor (for three times as much flow relative to the first reactor), a final fitting 412b to direct the flow of one fluidic channel 106 to analytical equipment to monitor the distributed fluid. Likewise, the fluid flows from multiple fixtures 600 each configured with a microfluidic fluid distribution manifold 100 can be likewise combined in various combinations, as will be apparent to one of ordinary skill.

FIG. 6A through 6D is a schematic diagram of a parallel reactor system 700 according to an embodiment of the invention. Referring first to FIG. 6A, the parallel reactor system 700 includes first and second reactant reservoirs 702, 704, first and second microfluidic fluid distribution manifolds 706, 708 in fluid communication with the first and second reactant reservoirs 702, 704, respectively, and first and second reactors 710, 712 configured to receive flows from each of the first and second microfluidic fluid distribution manifolds 706, 708. As can be seen, a first reactant in the first reactant reservoir 702 is received at a common port of the microfluidic fluid distribution manifold 706 where it is divided into five essentially equal independent fluid streams. Two of the independent fluid streams are combined in a first combining manifold 714, while the other three are combined in a second combining manifold 716. Likewise, a second reactant in the second reactant reservoir 704 is received at a common port of the microfluidic fluid distribution manifold 708 where it is also divided into five essentially equal independent fluid streams. Two of these independent fluid streams are combined in a third combining manifold 718, while the other three are combined in a fourth combining manifold 720. It will be noted that the microfluidic fluid distribution manifolds 706, 708 can be fabricated with five fluidic channels each, or can have more than five each with any unnecessary fluidic channels plugged, as described above.

The outputs of the first combining manifold 714 and the fourth combining manifold 720 are then combined to feed both reactants into the first reactor 710 with a ratio of two parts of the first reactant to three parts of the second reactant. Similarly, the two reactants are fed into the second reactor 712 with a ratio of three parts of the first reactant to two parts of the second reactant. Each reactor 710, 712 can include a material under investigation, such as a catalyst material. In the example of FIG. 6A, the ratio of the reactants varies between the two reactors 710, 712, and the material under investigation may be the same or different in each reactor 710, 712, for example, with respect to composition. It will be appreciated, however, that parallel reactor system 700 can be readily configured to have many more reactors, reactants, and splitters than shown and can be readily configured to have the same materials in some reactors and different materials in other reactors. The parallel reactor system 700 can also be readily configured to provide the same pressure but different flow rates to some reactors, the same flow rate but different pressures to some reactors, or combinations thereof. Likewise, merely a single reactant can be employed, or more than the two shown can be employed, and where more than one reactant is employed the ratio of the reactants directed to the various reactors can be the same or can be varied, for example, by adjustable manifolds. Other parameters can also be controlled, for instance, reactors can be heated or cooled.

The outputs of the first and second reactors 710 and 712 can be discharged to an effluent sink 721 (e.g., such as atmosphere or a waste vessel) with samples or subsamples thereof directed to an analytical measurement system 722. The analytical measurement system 722 measures reaction products from the reactors 710, 712. The analytical measurement system 722 can be a number of parallel analyzers, such as mass spectrometers, or can be a multi-channel analyzer, or can be a single-channel analyzer than can be switchably connected to the outputs of the various reactors.

FIG. 6B through 6D shows a parallel reactor system 800 that comprises eight reactors (not shown) within a heated enclosure 810. Feed lines 820 to the reactors are provided underneath in the embodiment as shown. The parallel reactor system 800 further comprises a fixture 600 comprising a support member 400 and a microfluidic chip 300 comprising a microfluidic fluid distribution manifold 100 of the invention. The support 400 comprises common fitting 412a and multiple independent fittings 412b for receiving a common fitting connecting device (not shown) and multiple corresponding independent fitting connecting devices (e.g., ferrule and nut assembly, shown only associated with independent fitting 412b, as 412b'). The fixture 600 is held together using the compressive force of bellville washer assembly 830. A source line (not shown) can provide a feed fluid through a common fitting 412a, which is split in the microfluidic flow distribution manifold 100 on chip 300, and discharged via independent fittings 412b to the reactor feed lines 820.

Figure 5:
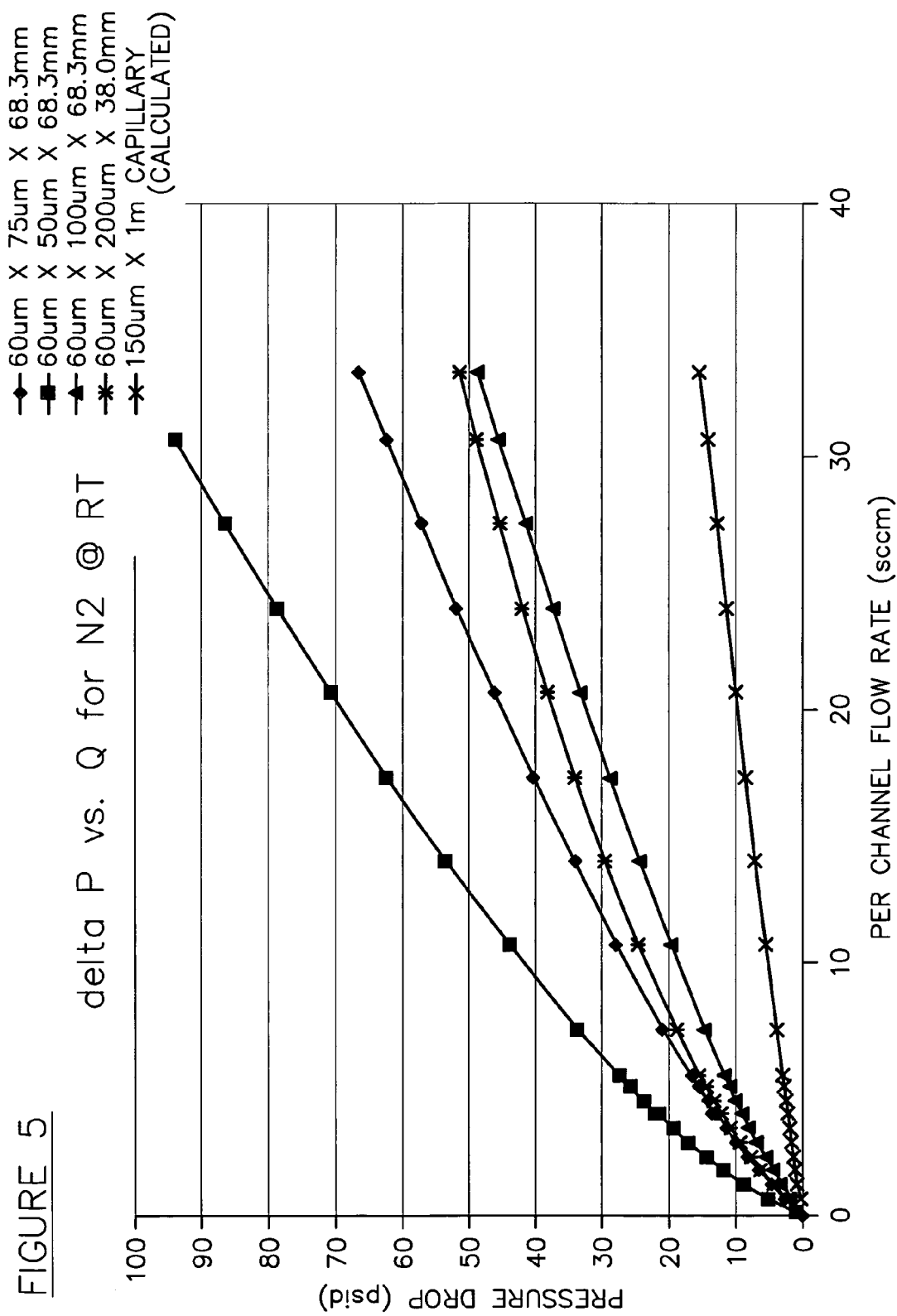
FIG. 5 is a graph of experimental data acquired from four micromachined flow restrictors according to embodiments of the invention.

FIG. 5 shows a graph of data representing pressure drop across a single fluidic channel versus flow rate in a single fluidic channel, as acquired for four experimental microfluidic fluid distribution manifolds having different fluidic channel geometries. Each of the experimental micromachined flow restrictors had the same fluidic channel height of 60μ, but varied in fluidic channel width between 50μ and 200μ. Three of the experimental micromachined flow restrictors had a fluidic channel length of 68.3 mm, while a fourth had a shorter length of 38.0 mm. The chart plots the measured pressure drop (pounds per square inch differential (psid)) across the fluidic channels (measured from the common port to the independent port) of the four experimental micromachined flow restrictors as a function of the per channel flow rate (standard cubic centimeters per minute (sccm)). The plots were obtained using nitrogen gas at room temperature and an outlet pressure maintained at 1 atmosphere. For comparison, the chart also includes a calculated plot for a capillary tube having a diameter of 150μ and a length of 1 m.

It will be noted from FIG. 5 that the pressure drops across each of the four experimental micromachined flow restrictors is significantly greater at all flow rates than the calculated capillary. This is advantageous because each component in a larger system will have an associated pressure drop, and it is desirable to have the pressure drop across the flow splitter be much larger than the sum of all of the other pressure drops in the system to provide substantially equal flowrates in a passive flow distribution system (without the use of expensive mass flow controllers). See, for example EP 1001846. It will also be noted from FIG. 5 that the observed variation in pressure drop versus flow rate is substantially linear.

In practice, to select an appropriate geometry for a micromachined flow restrictor for use in a larger system, such as a parallel reactor system, one could first determine a desired per channel flow rate. Then, one could determine a maximum acceptable pressure drop. Next, from either experimental data such as in FIG. 5, or from calculated data, one could select a geometry that provides an acceptable pressure drop at a desired flow rate.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A device comprising a microfluidic fluid distribution manifold for use as a microfluidic flow splitter to split a single fluid stream into multiple independent fluid streams or for use as a microfluidic flow combiner to combine multiple independent fluid streams into a single fluid stream, the microfluidic fluid distribution manifold comprising a common port for receiving or discharging a single fluid stream, four or more independent ports for discharging or receiving four or more respective independent fluid streams, and four or more fluidic channels, each of the four or more fluidic channels providing fluid communication between the common port and a respective one of the four or more independent ports, so that in operation as a flow splitter a single fluid stream is received at the common port and split into four or more independent fluid streams, each of which are discharged through a respective one of the four or more independent ports, or so that in operation as a flow combiner four or more independent fluid streams are received at the respective four or more independent ports and combined into a single fluid stream that is discharged through the common port, at least a portion of each of the four or more fluidic channels being spirally interleaved relative to the other fluidic channels, the spirally interleaved portion of each of the four or more fluidic channel's having a radius of curvature that increases with increasing distance from the common port, the microfluidic fluid distribution manifold being further characterized by one or more features selected from the group consisting of (i) each of the four or more fluidic channels comprising a spirally interleaved portion making more than one turn around the common port, (ii) each of the four or more of the fluidic channels having substantially the same overall resistance to flow, (iii) the microfluidic flow distribution manifold being adapted for operation with gaseous fluids, (iv) the microfluidic flow distribution manifold being adapted for operation with fluids at a temperature of more than about 100° C., (v) the microfluidic flow distribution manifold having an essential absence of active flow-control elements, (vi) the microfluidic flow distribution manifold further comprises one or more microfluidic filters adapted to filter non-fluidic contaminants from a fluid before the fluid is communicated through the four or more fluidic channels, and (vii) combinations thereof.

2. A device comprising a microfluidic fluid distribution manifold for use as a microfluidic flow splitter to split a single fluid stream into multiple independent fluid streams or for use as a microfluidic flow combiner to combine multiple independent fluid streams into a single fluid stream, the microfluidic fluid distribution manifold comprising a common port for receiving or discharging a single fluid stream, four or more independent ports for discharging or receiving four or more respective independent fluid streams, four or more fluidic channels, each of the four or more fluidic channels providing fluid communication between the common port and a respective one of the four or more independent ports, so that in operation as a flow splitter a single fluid stream is received at the common port and split into four or more independent fluid streams, each of which are discharged through a respective one of the four or more independent ports, or so that in operation as a flow combiner four or more independent fluid streams are received at the respective four or more independent ports and combined into a single fluid stream that is discharged through the common port, and one or more microfluidic filters adapted to filter non-fluidic contaminants from a fluid before the fluid is communicated through the four or more fluidic channels, wherein:

each of the four or more fluidic channels is spirally interleaved relative to the other fluidic channels, has a radius of curvature that increases with increasing distance from the common port, has more than one 1.1 turns around the common port, and has substantially the same overall resistance to fluid flow as the other fluidic channels;

the microfluidic flow distribution manifold is adapted for operation with gaseous fluids at a temperature of more than about 200° C. and has an essential absence of active flow control elements; and the one or more microfluidic filters are disposed in the common port.

3. The device of claims 1 or 2, wherein the radius of curvature of each of the four or more fluidic channels is substantially the same as other fluidic channels as a function of distance from the common port.

4. The device of claim 3, wherein each of the four or more fluidic channels has an overall resistance to fluid flow measured between the common port and the respective independent ports, the overall resistance to fluid flow for each of the four or more fluidic channels varying by not more than about 1%.

5. The device of claim 4, comprising nine or more fluidic channels, each of the nine or more fluidic channels providing fluid communication between the common port and a respective one of nine or more independent ports.

6. The device of claims 1 or 2, wherein each of the four or more fluidic channels are spirally interleaved relative to the other fluidic channels, have a radius of curvature that increases with increasing distance from the common port, and makes at least about 1.25 turns around the common port.

7. The device of claim 1, wherein the fluidic channels, the common port and the independent ports are at least partially defined in a common channel layer.

8. The device of claim 7 wherein the common channel layer has a first surface and an opposing second surface, the device further comprising
 a base layer having a first surface and second surface, the second surface of the base layer being disposed adjacent the first surface of the channel layer, and
 a capping layer having a first and second surface, the first surface of the capping layer being disposed adjacent the second surface of the channel layer.

9. The device of claim 7, further comprising a common aperture disposed through the base layer and in fluid communication with the common port.

10. The device of claim 9, further comprising four or more independent apertures disposed through the base layer, each of the four or more independent apertures being in fluid communication with one of the four or more independent ports.

11. The device of claim 1, wherein the one or more microfluidic filters are disposed within the common port.

12. The device of claim 11, wherein one or more microfluidic filters are disposed within each of the four or more independent ports.

13. The device of claim 12, comprising at least one microfluidic filter disposed substantially around the periphery of the common port.

14. The device of claim 13, wherein the at least one microfluidic filter comprises four or more filter channels disposed substantially around the periphery of the common port, each of the four or more filter channels having a smallest cross-sectional dimension that is equal to or smaller than a smallest cross-sectional dimension of the four or more fluidic channels.

15. The device of claim 14, wherein the at least one microfluidic filter comprises a number of filter channels, $N_{fc}$, disposed substantially around the periphery of the common port, the number of filter channels, $N_{fc}$, being at least 1.5 times the number of fluidic channels.

16. The device of claim 15, wherein the number of filter channels, $N_{fc}$, is at least 2 times the number of fluidic channels.

17. The device of claim 1 wherein the microfluidic flow distribution manifold further comprises one or more microfluidic filters adapted to filter non-fluidic contaminants from a fluid before the fluid is communicated through the four or more fluidic channels.

18. The device of claim 17, wherein the common port, the independent ports and the microfluidic filter are at least partially defined in a common channel layer.

19. The device of claim 18, wherein the common port, the independent ports and the microfluidic filter are microfabricated in a plurality of laminae comprising the common channel layer, a base layer having a first and second surface, the second surface of the base layer being disposed adjacent the first surface of the channel layer, and a capping layer having a first and second surface, the first surface of the capping layer being disposed adjacent the second surface of the channel layer.

20. The device of claim 1 wherein each of the four or more fluidic channels comprises a spirally interleaved portion making more than one turn around the common port.

21. The device of claim 1 wherein each of the four or more of the fluidic channels has substantially the same overall resistance to flow.

22. The device of claim 1 wherein the microfluidic flow distribution manifold is adapted for operation with gaseous fluids.

23. The device of claim 1 wherein the microfluidic flow distribution manifold is adapted for operation with fluids at a temperature of more than about 100° C.

24. The device of claim 1 wherein the microfluidic flow distribution manifold has an essential absence of active flow-control elements.

* * * * *